June 5, 1923.
F. S. BRITTEN
DISK SCRAPER AND FENDER
Filed April 10, 1922
1,457,960
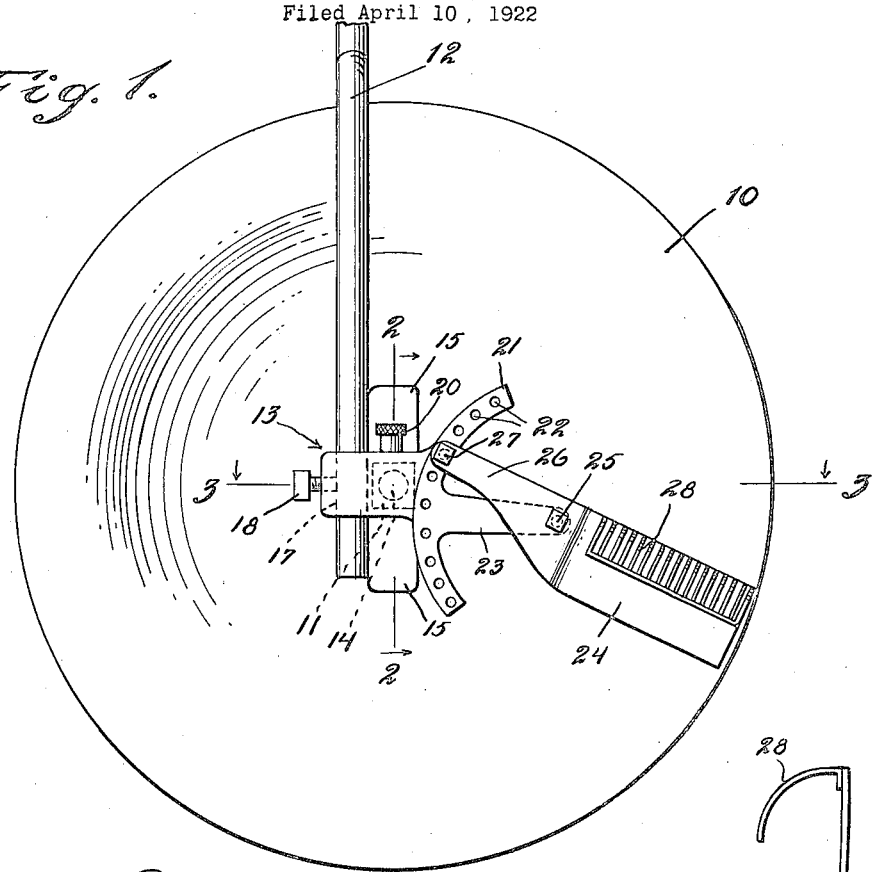
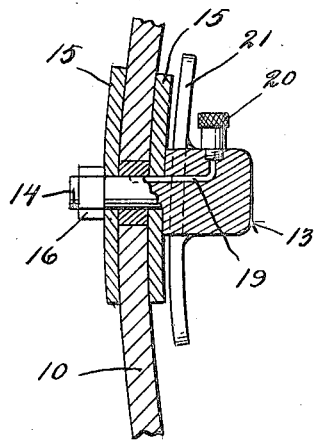
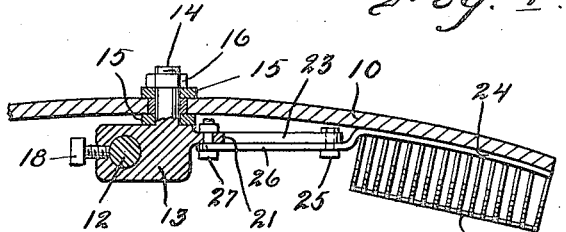
Inventor
Frank S. Britten
By John Milton Jester
Attorney Patented June 5, 1923.

1,457,960

UNITED STATES PATENT OFFICE.

FRANK S. BRITTEN, OF SOUTH ENGLISH, IOWA.

DISK SCRAPER AND FENDER.

Application filed April 10, 1922. Serial No. 551,204.

*To all whom it may concern:*

Be it known that I, FRANK S. BRITTEN, a citizen of the United States, residing at South English, in the county of Keokuk and State of Iowa, have invented certain new and useful Improvements in Disk Scrapers and Fenders, of which the following is a specification.

This invention relates to cultivators, particularly to disk shovels, and has for its object the provision of a disk shovel provided with a combined adjustable scraper and fender which may be placed at any desired position so as to permit close plowing or cultivating while at the same time preventing the soil from being thrown too high against the plants.

An important object is the provision of a shovel of this character which will be particularly advantageous for use in cultivating very young corn and in fact any vegetation as the device permits the dirt or earth to be rolled close to the plants while preventing it from being thrown entirely over the plants which would naturally be a disadvantage, the fender structure being freely adjustable to vary the height to which the earth will be thrown up, this feature being of distinct advantage as permitting adjustment to correspond with the growth of the vegetation.

An additional object is the provision of a device of this character which will be simple and inexpensive in manufacture, easy to install and use, efficient and durable in service, and a general improvement in the art.

The construction, mounting and operation of the device will be readily comprehended from a study of the description taken in conjunction with the accompanying drawings, though it is to be distinctly understood that the detailed disclosure is merely an exemplification of a preferred development of the invention, and that I reserve the right to adopt many variations and make such modifications as will widen the field of its usefulness, provided always that such changes involve no departure from the salient features or spirit of the invention, or the scope of the appended claims.

In the accompanying drawings, wherein like reference characters designate like parts throughout the description, Figure 1 is a side elevation of my improved cultivator disk shovel.

Figure 2 is a detail section on the line 2—2 of Figure 1.

Figure 3 is a detail section on the line 3—3 of Figure 1.

Figure 4 is an end view of the scraper and fender.

Referring more particularly to the drawings, the numeral 10 designates a cultivator disk which is formed centrally with a square hole within which is engaged a removable bushing 11. The disk is supported from the standard 12 by means of a member designated broadly by the numeral 13 which forms the support for the various elements to be hereinafter described. This member may be formed as a single casting and is provided at one side with a stud shaft 14 which passes through a circular hole in the bushing 11 and also through holes in elongated washers 15 disposed against opposite sides of the disk, the free end of the stub shaft being threaded and carrying a nut 16 which provides for tightening up the parts so as to prevent excessive play. The member 13 is formed with a bore 17 within which is slidably and rotatably adjustable the standard 12, adjustment being maintained by means of a set-screw 18.

In order to provide for lubrication during the rotation of the disk, I provide the member 13 with a passage 19 which has one end terminating at the center of the bushing 11 and which has its other end enlarged for the reception of the threaded end of any ordinary or preferred type of oil or grease cup 20.

Formed integrally with the member 13 and forming a permanent part thereof, is an arcuate bracket 21 which is formed throughout its length with a series of holes 22. Formed with this bracket is an arm 23 which has its free end provided with a hole which forms the center of the arc defined by the bracket 21.

The numeral 24 designates a scraper which may vary in size and shape and which is here shown as being an elongated plate pivoted intermediate its ends upon the end of the arm 23 by means of a bolt 25. This scraper plate has one end reduced, as shown at 26, and pivotally connected with the bracket 21 by means of a bolt 27 which passes through the scraper plate and through a selected one of the holes 22, depending upon the position of the scraper desired, that is depending upon the character of the plants to be cultivated. Carried by the upper edge of the outer portion of the scraper plate is a fender 28 which might be formed as a sheet metal shield but which is here shown as being of a grid-like construction and substantially a quarter-circle in shape, as disclosed clearly in Figure 4. This fender might of course be formed as a casting, if preferred, though in actual practice it may be preferable to construct it of heavy wire or thin rods arranged as shown.

In the operation it will be seen that the shovel is used in the same manner as any other except that it has the great advantage of being equipped with a combined scraper and fender. When cultivating very young corn or other small plants, the scraper should be so adjusted that it will be inclined downwardly to an appreciable extent, for instance as shown in Figure 1, or to a still greater extent if desired, this position being obtained by placing the bolt 27 through one of the uppermost holes 22. The scraper plate 24 will operate to scrape off any dirt which may clog the disk and consequently keep the disk clean so that it will operate very efficiently in breaking up the ground. The fender 28 will of course cause the dirt to be thrown away from the disk at a comparatively low elevation so as to prevent the earth from being thrown too high onto and possibly over the plants. As the plant growth progresses or in the event of cultivating vegetation of a taller character, the scraper should be adjusted in the other direction so that the fender 28 will be at a higher elevation and permit the dirt to be thrown higher against the plants. It will be seen that in this way it will be easily possible to accomplish very close cultivation without any danger of injuring the plants by partially or entirely burying them. It is to be noted that the entire disk and the parts carried thereby may be adjusted up or down along the standard and also rotatably upon the standard to meet various conditions which may arise in actual practice.

From the foregoing description and a study of the drawings it will be apparent that I have thus provided a simply constructed and consequently inexpensive cultivator disk scraper and fender which will be very efficient for all the functions for which it is intended and which is provided with ample adjusting means to take care of all contingencies. Owing to the simplicity and the fewness of the parts it is apparent that there is nothing to get out of order so that the device should have a long life.

I claim:—

1. In a culivator including a standard and a disk, a member slidably and rotatably adjustably mounted upon the standard and carrying a stub shaft serving as a journal for the disk, an arcuate bracket carried by said member, an arm carried by said member, and a scraper pivotally mounted upon said bracket and having one end adjustably connected with said arcuate bracket.

2. In a cultivator including a standard and a disk, a member slidably and rotatably adjustably mounted upon the standard and carrying a stub shaft serving as a journal for the disk, an arcuate bracket carried by said member, an arm carried by said member, a scraper pivotally mounted upon said bracket and having one end adjustably connected with said arcuate bracket, and a fender carried by said scraper and curved outwardly and downwardly with respect thereto.

3. In a cultivator including a standard and a disk, a member slidably and rotatably adjustably mounted upon the standard and carrying a stub shaft serving as a journal for the disk, an arcuate bracket carried by said member, an arm carried by said member, a scraper pivotally mounted upon said bracket and having one end adjustably connected with said arcuate bracket, and a fender carried by said scraper and formed as an open grid-like structure substantially of one-quarter cylindrical shape and curved outwardly and downwardly with respect to the scraper.

4. In a cultivator including a standard and a disk, a member slidably and rotatably adjustably mounted upon the standard and carrying a stub shaft serving as a journal for the disk, an arcuate bracket carried by said member, an arm carried by said member, a scraper pivotally mounted upon said bracket and having one end adjustably connected with said arcuate bracket, said arcuate bracket being formed with a plurality of holes, and a bolt at the inner end of the scraper plate engaged within a selected one of said holes.

5. Means for mounting a cultivator disk upon a standard comprising a member formed with a bore slidably and rotatably engaged upon the standard, a set-screw for maintaining adjustment, a stub shaft carried by said member and serving as a journal for the disk, a bracket carried by said member, an arm carried by said member, and a combined scraper and fender pivoted intermediate its ends upon said arm and having its inner end adjustably connected with said bracket.

In testimony whereof I affix my signature.

FRANK S. BRITTEN.